July 29, 1969     B. ROGGE     3,457,691
METHOD AND APPARATUS FOR FEEDING CAPSULES
Filed Aug. 3, 1967
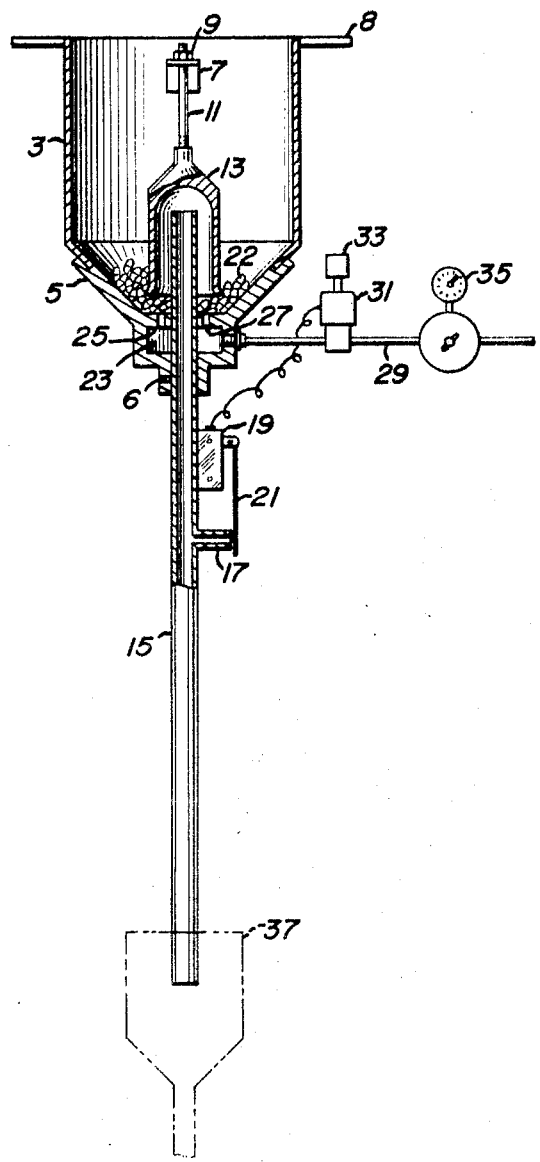
INVENTOR.
Bernhard Rogge
BY Harry M. Saragovitz,
Edward J. Kelly, Herbert Berl
& Bernard J. Ohlendorf
ATTORNEYS 3,457,691
METHOD AND APPARATUS FOR FEEDING CAPSULES
Bernhard Rogge, Cherry Hill Road, Baldwin, Md. 21013
Filed Aug. 3, 1967, Ser. No. 658,290
Int. Cl. B65b 1/04, 3/00; B65h 3/08
U.S. Cl. 53—3                                    2 Claims

ABSTRACT OF THE DISCLOSURE

A capsule feeding method and device is disclosed, the device comprising a hopper means, air supply means, air pressure control means, conduit means, automatic shut-down means, and automatic start-up means.

---

This invention relates to an apparatus for feeding plastic capsules into a filling machine.

The invention is specifically designed to be utilized with an apparatus for filling and sealing the cartridges of two-piece capsules such as is disclosed in U.S. Patent 3,070,932.

The prior art means of capsule feeding utilized in a chemical agent filling machine was manual whereby the capsules were scooped up in a small quantity out of a container by the operator and dumped into a small hopper located above the filling machine. The prior art operation was unsatisfactory, because the operator had to wear an air supplied mask and protective clothing due to the hazard of atmosphere contamination by chemical warfare agent dust. Moreover, the capsules are comprised of two halves assembled with a slip fit of one half within the other, as in the case of a medicinal capsule; and the handling of the capsules by the prior art means resulted in the separation of the two halves of some capsules and other mechanical damage. The separation and mechanical damage caused the filling machine to clog thereby necessitating the production operation to be shut down.

A principal object of my invention is to provide a non-hazardous means of filling chemical agent capsules.

Another object of my invention is to provide a means of filling chemical agent capsules whereby mechanical damage, such as separation or crushing of the capsules, is avoided.

Other objects of my invention will be obvious or will appear from the specification hereinafter set forth.

The drawing is a schematic diagram of my feeding apparatus shown in elevation and partly in section.

My invention will now be described in detail as follows:

My capsule feeding apparatus comprises a storage hopper 3 for containing plastic capsules 22, having a mounting flange 8 located at its upper open end. The open apex of the hopper terminates and is fastened within an annular recess of a retainer 5. The storage hopper 3 has a bracket 7 fastened within the hopper and thereto on the periphery of the hopper near the upper edge thereof. A bell shaped trap 13 is suspended from the bracket 7 by means of a nut 9 and a bolt 11. Trap 13 is centrally located within storage hopper 5, and the ceiling of trap 13 is hemispherical in shape with the lower edge or the rim thereof being flared outwardly. Retainer 5 has a central bore which is penetrated by a drop pipe 15. Drop pipe 15 is provided with a back pressure tap 17 and a microswitch 19 containing a hinged air indicator 21. The upper end of pipe 15 terminates near the hemispherical ceiling of trap 13. Pipe 15 is fastened within retainer 5 by means of set screw 6. The distance between the upper edge of pipe 15 and the trap ceiling can be easily controlled by means of nut 9 which serves as a means for adjusting the height of bell trap 13 in relation to drop pipe 15 to obtain the most efficient feeding and flow of capsules 22. Hopper retainer 5 has an annular chamber 23 having an upper partition 25. Partition 25 has a plurality of radially located and evenly spaced $\frac{1}{16}''$ in diameter air ports 27. The side wall of the chamber 23 has an air line 29 located therein which in turn is provided with a two-way solenoid valve 31 and a time delay switch 33 for actuating the microswitch 19. The system is designed to receive approximately 30 to 40 p.s.i. of air which is reduced by means of pressure control device 35 and delivered at approximately 6 to 8 p.s.i. into chamber 23.

Operation is initiated with the apparatus already being installed and positioned over the filling and sealing machine (not shown) with drop pipe 15 extending into working hopper 37; a part of the filling and sealing machine. Storage hopper 3 is filled to its capacity with capsules by the operator from an enclosure located above the apparatus. After starting the filling and sealing machine, air is introduced into chamber 23 by means of air line 29 and regulated by means of pressure control device 35. The air is forced through the plurality of ports 27 under the bell trap 13 whereby a light air turbulence is created by the air stream. The action of the air creating turbulence subjects the capsules to a bouncing effect which tends to force the capsule halves together. Capsules 22 are blown by means of the air stream into drop pipe 15 and downward into working hopper 37 from whence the capsules are gravity fed into the filling and sealing machine.

When the desired capsule quantity in lower working hopper 37 has been reached, the air introduced through line 29 into the chamber 23 and on through to the ports 27 and into pipe 15 backs-up and escapes through the back pressure tap 17, thereby opening or displacing the vane air indicator 21. Actuation of the vane air indicator 21 causes the microswitch 19 and the solenoid valve 31 to actuate, which shuts off the air supply to the storage hopper 3. The pre-set time delay switch 33 restarts air flow after the time delay period has expired. The electrical circuitry for controlling the shut-off and restart means is known in the art. All of the above operations are carried out by the operator isolated from the dusty atmosphere of the filling machine.

It is obvious that other modifications can be made of my invention, and I desire my invention to be limited only by the scope of the appended claims.

I claim:

1. A capsule feeding device comprising a hopper means, a conduit means located within said hopper means, a flange mounting means located on the periphery of the upper extremity of said hopper means, a bell trap centrally suspended within said hopper means above said conduit means for controlling the quantity of capsule flow, a compartment means located below said hopper means, port means connecting said compartment means with said hopper means, air supply means connected to said compartment means for connection to an air supply, air pressure regulation means connected to said air supply means, air pressure cut-off means located within said conduit means, automatic start-up means connected to said cut-off means to reset the air supply, and electrical circuit means connecting said cut-off and start-up means.

2. A method of feeding capsules to a capsule feeding and sealing apparatus comprising the steps of filling a storage hopper with a predetermined quantity of empty capsules, starting the filling and sealing apparatus, providing air flow into the storage hopper containing the empty capsules, regulating said air flow, conveying said capsules by means of said air flow through a conduit to a working hopper of said filling and sealing apparatus.

References Cited

UNITED STATES PATENTS

| 2,668,636 | 2/1954 | Martin | 221—278 X |
| 3,002,327 | 10/1961 | Kirby | 53—197 |
| 3,297,242 | 1/1967 | Karp | 302—2 X |

THERON E. GORDON, Primary Examiner

R. L. SPRUILL, Assistant Examiner

U.S. Cl. X.R.

221—278; 302—2